United States Patent [19]

Nishikawa et al.

[11] 4,180,833
[45] Dec. 25, 1979

[54] APPARATUS AND METHOD FOR REPRODUCING VIDEO SIGNALS

[75] Inventors: Masaru Nishikawa, Kounosu; Toshihiko Numakura, Kamakura; Jun Hirai, Tokyo, all of Japan

[73] Assignee: Sony Corporation, Tokyo, Japan

[21] Appl. No.: 877,867

[22] Filed: Feb. 15, 1978

[30] Foreign Application Priority Data

Feb. 24, 1977 [JP] Japan .................................. 52-19479

[51] Int. Cl.$^2$ .......................... G11B 5/02; H04N 5/78
[52] U.S. Cl. ........................................ 360/21; 360/33
[58] Field of Search ............................. 360/21, 33, 10

[56] References Cited

U.S. PATENT DOCUMENTS

| | | | |
|---|---|---|---|
| 3,157,738 | 11/1964 | Okamura | 360/10 |
| 3,911,483 | 10/1975 | Kihara et al. | 360/33 |
| 3,925,816 | 12/1975 | Kihara | 358/4 |
| 3,939,485 | 2/1976 | Amari et al. | 358/4 |

Primary Examiner—Vincent P. Canney
Attorney, Agent, or Firm—Lewis H. Eslinger; Alvin Sinderbrand

[57] ABSTRACT

In an apparatus for reproducing video signals which are recorded as modulations of a carrier on a record medium, such as a magnetic tape, in successive, abutting parallel record tracks, with the signals being recorded in alternating tracks with different first and second azimuth angles, first and second magnetic heads are provided for sequentially scanning the tracks in which signals are recorded with the first and second azimuth angles, respectively, and the first and second magnetic heads having azimuth angles corresponding to the first and second azimuth angles of the respective tracks to be scanned thereby. Each of the magnetic heads is dimensioned and guided in the direction transverse to the direction along the respective track being scanned so as to overlap an adjacent track by a distance $\Delta W = n\lambda/\tan\theta$ ($n = 1, 2, \ldots$), in which $\lambda$ is the wavelength of the carrier as modulated by synchronizing signal portions of the video signals recorded in such adjacent track, and $\theta$ is the difference between the first and second azimuth angles of the heads. In this manner, cross-talk from the adjacent track is substantially attenuated.

5 Claims, 10 Drawing Figures

APPARATUS AND METHOD FOR REPRODUCING VIDEO SIGNALS

BACKGROUND OF THE INVENTION

1. Field of the Invention

This invention relates generally to the reproduction of video signals, and more particularly, is directed to the reduction of cross-talk in the reproduction of signals recorded in adjacent tracks.

2. The Prior Art

It is well-known to record video signals on magnetic tape or other forms of record medium by scanning successive parallel tracks on the record medium with one or more transducers energized by the video signals. There has been a constant effort to improve the efficiency of use of the record medium by packing the tracks as close together as possible. The packing density has always been limited by, among other things, the fact that, during reproduction of the recorded signals, a reproducing transducer scanning each of the tracks in order could pick up signals or cross-talk from adjacent tracks.

One effort made to minimize cross-talk has been to use two transducers having air gaps with different azimuth angles for successive lines. This is relatively easy to do because most magnetic recording apparatus for video signals includes a rotary drum provided with two transducers or heads which can have gaps with different azimuth angles. The tape is wrapped helically about a portion of the perimeter of the drum and moved longitudinally along this helical path while the transducers or heads are rotated, thus bringing the heads alternately into recording relationship with the tape and allowing each head to trace out a respective one of the tracks. Each transducer or head has a finite width and thus produces magnetization of those magnetic domains in the material on the tape in what would appear to be, if such domains were visible, a series of parallel lines or stripes, each having a length as great as the width of the track, and each having an orientation that corresponds to the azimuth angle of the gap of the transducer or head used to record that track.

By recording successive alternate tracks with transducers or heads having different azimuth angles, and in view of the fact that the reproducing transducers or heads would also have corresponding azimuth angles, the gap of the reproducing transducers or heads would be aligned with the parallel, but fictitious, lines of the track being scanned thereby, but, because of the difference in azimuth angles, would extend at an angle to such lines of the next adjacent track. If the reproducing transducer overlapped that adjacent track, the well-known azimuth loss would result in attenuation of the signal reproduced from the adjacent track. Even if the reproducing transducer accurately scans a track recorded with the same azimuth, the reproducing transducer may still be influenced by the signals recorded in adjacent tracks with different azimuths, but the azimuth loss will decrease or eliminate the effect of such signals recorded in adjacent tracks on the output signal of the transducer.

Even in the above type of recording with different azimuth angles, there is still a limit to the overlapping of adjacent tracks. In the case where the video signals are not recorded with H-alignment, which means that horizontal synchronizing signals of the video signals recorded in the adjacent tracks are aligned in traverse direction of the tracks, the relatively large frequency differences occur between the signal being reproduced from a track being scanned and the cross-talk from the adjacent tracks. By reason of such relatively large frequency differences, the resulting relatively high level interfering signals cannot be sufficiently eleminated by the azimuth loss.

OBJECTS AND SUMMARY OF THE INVENTION

Accordingly, it is a principle object of the invention to provide an improved apparatus for reproducing video signals recorded on a record medium, and in which cross-talk from record tracks adjacent to those being scanned is substantially attenuated.

It is another object of the invention to provide an apparatus for reproducing video signals recorded in successive parallel tracks on a record medium which abut along their longitudinal edges, and in which cross-talk due to the carrier as modulated by synchronizing signal portions of video signals recorded in a track adjacent that being scanned is substantially attenuated by dimensioning each of the magnetic heads scanning the respective record tracks so as to overlap an adjacent track by a predetermined distance.

It is still another object of the invention to provide an apparatus for reproducing video signals recorded in successive parallel record tracks on a record medium by means of a pair of magnetic heads having different azimuth angles, and in which each of the magnetic heads has a head width greater, by a predetermined amount, than the width of the track being scanned.

In accordance with an aspect of the present invention, in an apparatus for reproducing video signals recorded on a record medium, such as a magnetic tape, in successive parallel record tracks of the medium which abut along their longitudinal edges, and in which the recorded video signals include information and synchronizing signal portions modulating a carrier with a first set of the record tracks comprised of every other one of the tracks having the signals recorded therein at a first azimuth angle and the remaining tracks constituting a second set of the record tracks having the signals recorded therein at a second azimuth angle different from said first azimuth angle; first and second magnetic heads are provided for sequentially scanning tracks of the first and second sets of tracks, respectively, and have azimuth angles corresponding to the first and second azimuth angles of the respective tracks to be scanned by such heads, and each of the magnetic heads is dimensioned and guided in the direction transverse to the respective tracks scanned thereby so as to overlap an adjacent track by a distance $\Delta W = n\lambda / \tan \theta$ ($n = 1, 2, \ldots$), in which $\lambda$ is the wavelength of the carrier as modulated by the synchronizing signal portions of the video signals in the adjacent track that is overlapped, and $\theta$ is the difference between the first and second azimuth angles of the heads. In this manner, the cross-talk from the adjacent track is substantially attenuated.

The above, and other objects, features and advantages of the present invention, will be apparent from the following detailed description which is to be read in connection with the accompanying drawings.

DESCRIPTION OF THE PREFERRED EMBODIMENTS

Figure 1:
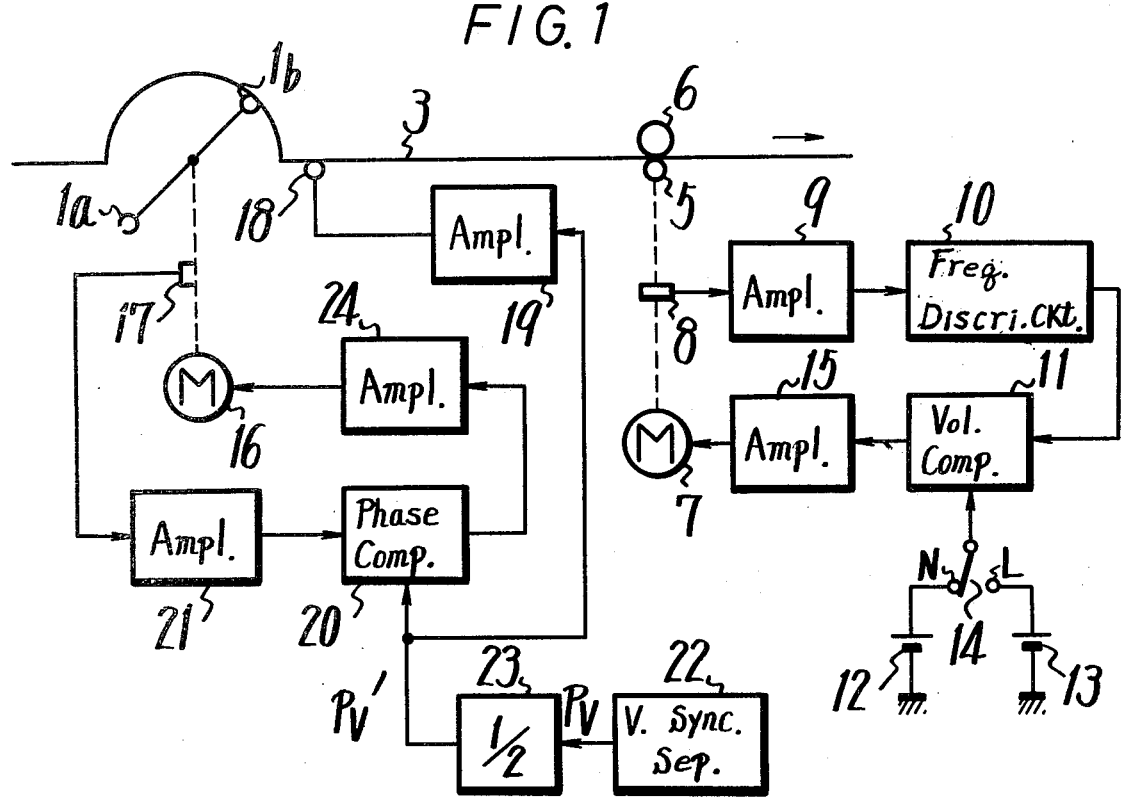
FIG. 1 is a block diagram showing a recording servo circuit that may be employed in this invention.

Referring to the drawings in detail, it will be seen that the invention is applied to a magnetic tape video signal recording and reproducing apparatus of the helical scan type having a pair of diametrically opposed, rotary magnetic heads $1a$ and $1b$, as shown in FIG. 1, which are rotated at the rate of 30 revolutions per second by means of a motor 16. A magnetic tape 3 is wrapped helically about a portion of the periphery of a guide drum associated with heads $1a$ and $1b$, and is driven longitudinally at a selected one of two different tape speeds by the cooperative action of a rotated capstan 5 and a pinch roller 6. A motor 7 for driving capstan 5 has its speed of operation regulated by a suitable motor control circuit having a switch 14. In the motor control circuit, a frequency generator 8 is provided in association with the shaft connecting motor 7 for generating an alternating current signal having a frequency and amplitude proportional to the rotational speed of the motor 7. The alternating current signal is supplied through a wave forming circuit 9 to a frequency discriminating circuit 10, which produces a direct current voltage proportional to the frequency, that is, the rotating speed of the motor 7. The direct current voltage is further applied to a voltage comparator 11, in which the former voltage is compared with a reference voltage from the switch 14, and which, on the basis of voltage difference between the voltages received from the frequency discriminating circuit 10 and the reference voltage, varies its output voltage applied to a servo amplifier 15 for controlling the motor 7. In the apparatus of FIG. 1, the switch 14 is controlled so that during normal tape speed the movable arm of the switch 14 is engaged with its contact N, to which a relatively high voltage from a voltage source 12 is supplied, while during slow tape speed the arm thereof is engaged with its contact L, to which a relatively low voltage from a voltage source 13 is supplied. Thus, when switch 14 is in the illustrated position engaging its contact N, the motor control voltage thus applied from the amplifier 15 to motor 7 causes the latter to drive capstan 5 at a rotational speed corresponding to normal tape speed. On the other hand, when switch 14 is changed-over to engage its contact L, the motor control voltage to motor 7 causes the latter to rotate capstan 5 at a reduced speed for driving the tape at a relatively slow speed for long playing operation of the recording and reproducing apparatus. The two different tape speeds obtained when switch 14 engages its N and L contacts, respectively, are selected so that, for example, if video signals can be recorded on a predetermined length of tape T for one hour when the tape is driven at the normal speed, video signals can be recorded on such predetermined length of tape for two hours when the slow or long-playing tape speed is selected. Furthermore, in the apparatus illustrated on FIG. 1, a rotation indicating pulse generator 17 is provided, for example, in association with the shaft connecting motor 16 with heads $1a$ and $1b$, for producing a rotation indicating pulse for each revolution of the heads, with such pulse being in a predetermined phase relation to the rotational position of heads $1a$ and $1b$. In order to synchronize the rotation of heads $1a$ and $1b$ with the field intervals of the video signals so that each of the rotary heads will record a field interval as it scans a record track extending obliquely across tape 3, a sync separating circuit 22 is connected for separating vertical synchronizing signals $P_v$ from the video signals. The separated vertical synchronizing signals $P_v$, which occur at the frequency of the field intervals, are applied to a frequency dividing circuit 23 which divides by two so as to provide a synchronizing pulse $P'_v$ at the frequency of the frame intervals. The synchronizing pulse $P'_v$ is applied to a phase comparator 20, and the rotation indicating pulses from generator 17 are applied through a pulse forming circuit 21 to phase comparator 20 which, on the basis of phase deviation between the pulses received from frequency divider 23 and pulse forming amplifier 21, suitably varies its output or control voltage applied to a servo amplifier 24 for controlling motor 16. Thus, the rotation of heads $1a$ and $1b$ is controlled so that each head will commence its scanning obliquely across tape 3 at the commencement of a field interval of the video signals being recorded. The synchronizing pulse $P'_v$ is further shown to be applied through an amplifier 19 to a fixed magnetic head 18 which, in the recording operation of the apparatus, is effective to record the synchronizing pulses $P'_v$ as track identifying control signals CTL at suitably spaced apart locations along a longitudinal edge of tape 3.

Figure 3A:
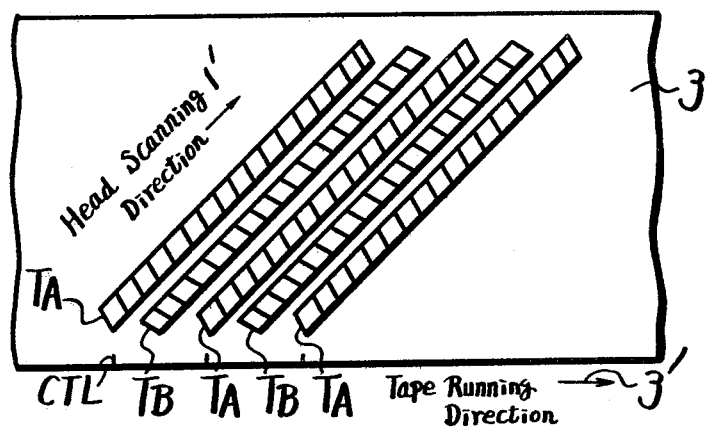
FIGS. 3A and 3B are schematic views of portions of a magnetic tape respectively showing successive parallel tracks in which video signals are recorded and reproduced by the circuits of this invention when the magnetic tape is advanced at a relatively high or normal speed, and at a relatively slow speed for increasing the recording density and thereby increasing the playing time of the tape.

As shown on FIG. 3A, during the recording operation of the apparatus with the normal tape speed, heads $1a$ and $1b$ are alternately operative to record respective field intervals of the frequency-modulated video signals in respective parallel record tracks $T_A$ and $T_B$ which are alternately arranged with a predetermined track pitch so as to provide guard bands of constant width between the adjacent tracks $T_A$ and $T_B$. On the other hand, as shown on FIG. 3B, when recording with the slow or long-playing tape speed, which is, for example, one-half the normal tape speed, the track pitch is correspondingly reduced so that the successively scanned tracks overlap each other.

Figure 3B:
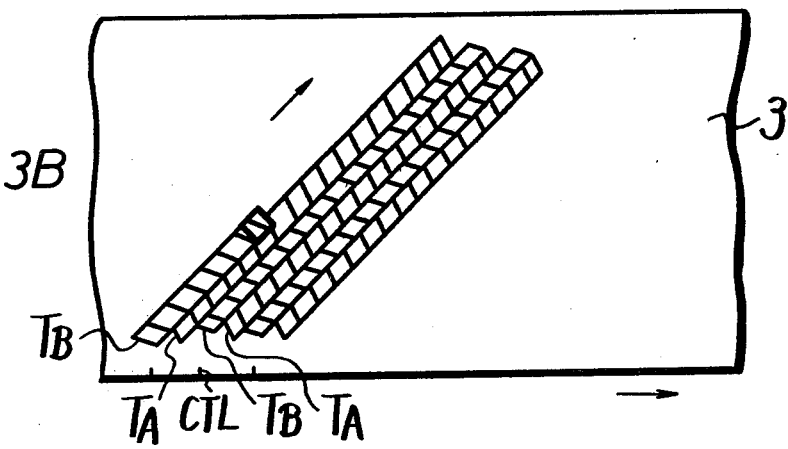

Thus, for example, as head $1b$ scans a record track $T_B$ on tape 3, such track overlaps the track $T_A$ previously scanned by the head $1a$, as shown on FIG. 3B, with the result that the effective widths of the successive tracks $T_A$ and $T_B$ are substantially reduced and the guard bands therebetween are eliminated for providing a high recording density.

As previously mentioned, each of the tracks $T_A$ and $T_B$ preferably has recorded therein the signal information corresponding to a respective field interval of the video signals, and each track is divided into successive areas or increments each having recorded therein the signal information corresponding to a horizontal or line interval of the respective field of the video signals. Each line interval and each field interval of the video signals contains a on information blanking and synchronizing portion and, in accordance with accepted practice, the relative movements of the heads and the tape, as indicated by the arrows 1' and 3' on FIGS. 3A and 3B, are preferably regulated in accordance with the synchronizing signals of the video signals to be recorded so as to obtain H-alignment of the areas in which line intervals are recorded in each track with the areas in which line intervals are recorded in the next adjacent tracks, while recording at the normal tape speed. In other words, as shown schematically on FIG. 3A, when recording at the normal tape speed, the ends of the margins between the areas in which the line intervals are recorded in each of the tracks $T_A$ are aligned, in the direction transverse to the lengths of the tracks, with the adjacent ends of such margins in the next adjacent tracks $T_B$.

Figure 2A:
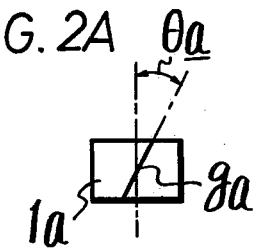
FIGS. 2A and 2B are schematic views illustrating the azimuth angles of the magnetic heads employed for recording and reproducing video signals which are processed by the recording and reproducing circuits of this invention, respectively.
Figure 2B:
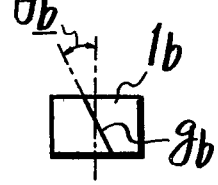

Further, as shown schematically on FIGS. 2A and 2B, heads 1a and 1b have air gaps ga and gb, respectively, arranged at substantially different azimuth angles $\theta_a$ and $\theta_b$ in respect to the plane of rotation of the heads. By reason of the foregoing, each of the heads 1a and 1b, when recording video signals in the respective tracks on tape 3, effects magnitization of magnetic domains in the magnetic coating on the tape in what would appear to be, if such domains were visible, a series of parallel lines or stripes extending across the respective track and each having an orientation that corresponds to the azimuth angle $\theta_a$ or $\theta_b$ of the gap of the respective head 1a or 1b.

Figure 4:
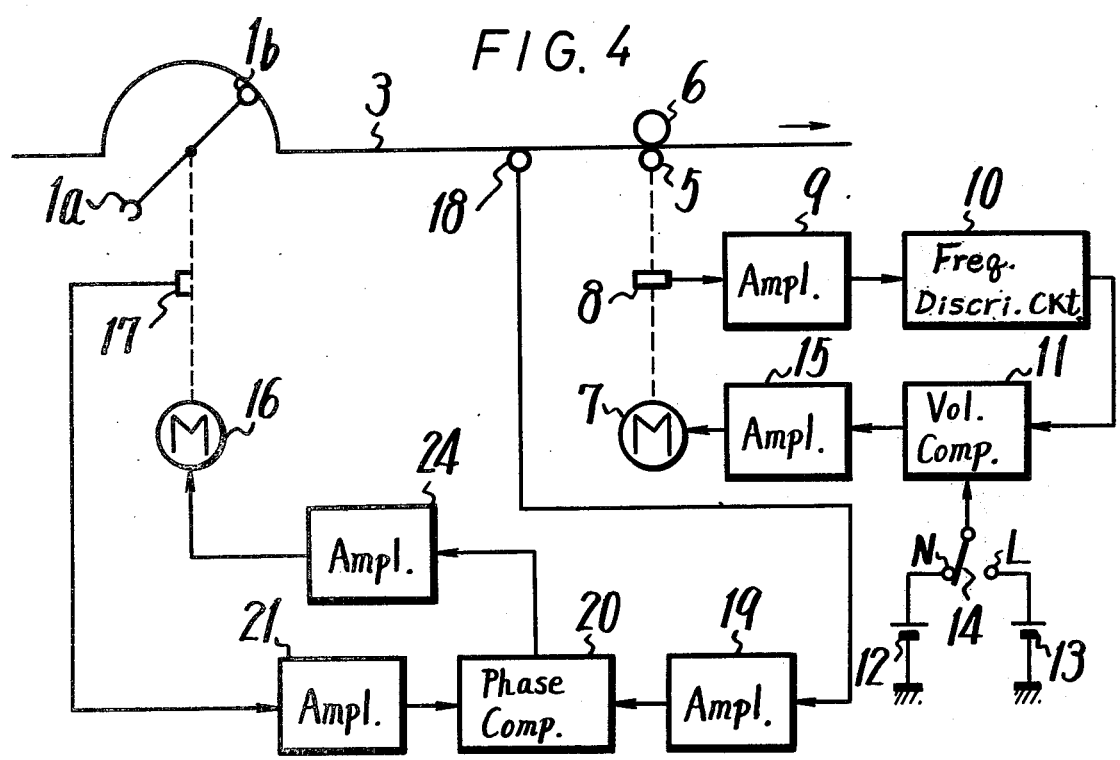
FIG. 4 is a block diagram showing a reproducing servo circuit that may be employed in this invention.

Referring now to FIG. 4, it will be seen that a number of the elements described above in connection with the recording operation of the apparatus are also employed in connection with the reproducing operation of such apparatus and are identified by the same reference numerals on FIG. 1. Thus, during the reproducing operation, either the normal tape speed or the relatively low or long-playing tape speed is determined by the position of switch 14 which regulates the speed of motor 7 driving capstan 5. During the reproducing operation, fixed magnetic head 18 reproduces the successive track indicating signals CTL recorded along a longitudinal edge of tape 3 and applies the same to the pulse-forming amplifier 19 which provides suitably shaped pulses to phase comparator 20. Simultaneously, rotation indicating pulses from generator 17 are applied through pulse-forming circuit 21 to another input of phase comparator 20 which, on the basis of a phase comparison of the pulses for circuits 19 and 21, applies a corresponding control voltage to servo amplifier 24 for controlling the rotation of motor 16 driving rotary heads 1a and 1b. Thus, the rotation of heads 1a and 1b is suitably controlled so that, during a reproducing operation with the tape moving at the same speed employed for a previous recording operation, tracks $T_A$ and $T_B$ will be accurately scanned by the same heads 1a and 1b, respectively, that were previously employed for recording frequency modulated video signals in such tracks.

As is well known, the frequency modulated video signals alternately reproduced by heads 1a and 1b from successive tracks $T_A$ and $T_B$ are successively applied to a frequency demodulator, in which the frequency modulated video signals are demodulated to obtain the original video signals.

As is apparent from FIG. 3A, during the reproducing operation, at the normal tape speed, of signals recorded at such normal tape speed, the tracks $T_A$ and $T_B$ scanned by heads 1a and 1b, respectively, are of the same width as the heads so that each of the heads can be made to scan only the respective track during reproducing. By reason of the foregoing, and further by reason of the guard bands between the adjacent tracks and the different azimuth angles of the gaps ga and gb of heads 1a and 1b, the level of any cross-talk signals is reduced to a great extent so that interfering signals due to cross-talk are not a problem. On the other hand, as is apparent from FIG. 3B, when recording with the slow or long-playing tape speed, the effective width of each of the tracks $T_A$ and $T_B$ that remains on tape 3 at the completion of the recording operation is substantially less than the width of each of the heads 1a and 1b. Therefore, when reproducing with the slow or long-playing tape speed, each of the heads 1a and 1b, when scanning and reproducing the signals recorded in a track $T_A$ or $T_B$, respectively, will also scan a portion of the width of an adjacent track $T_B$ or $T_A$, respectively, so as to also reproduce the signals recorded in the latter as a cross-talk signal. Therefore, the level of the cross-talk signal, in the case of reproducing with the slow or long-playing tape speed, is substantially increased relative to the level of the cross-talk signal in the case of reproducing with the normal tape speed. Furthermore, by reason of the reduced width of the tracks $T_A$ and $T_B$ when recording with the slow or long-playing tape speed, the different azimuth angles of the air gaps of heads 1a and 1b are of reduced effectiveness in attenuating or decreasing the level of the cross-talk signal during reproducing with the slow or long-playing tape speed. Therefore, when reproducing with the slow or long-playing tape speed, the cross-talk signal can give rise to a disturbing interfering signal insofar as there is a substantial difference in frequency between the cross-talk signal and the signal being simultaneously reproduced from the track which is actually being scanned.

Furthermore, if the signals are recorded with H-alignment between signals recorded in adjacent tracks during recording with the normal tape speed, as shown on FIG. 3A, H-alignment cannot be obtained when recording with the slow or long-playing tape speed, as shown in FIG. 3B. By reason of the absence of H-alignment of the signals recorded with the slow or long-playing tape speed, relatively large frequency differences occur between the signal being reproduced from a track being scanned and the cross-talk signal from an adjacent track when reproducing with the long-playing tape speed. By reason of such relatively large frequency differences, the resulting relatively high level interfering signals cannot be sufficiently eliminated by the azimuth loss resulting from the different azimuth angles of the air gaps of heads 1a and 1b.

Particularly, in the case where the head 1a or 1b, when scanning and reproducing the video signal portion recorded in the track $T_A$ and $T_B$, respectively, scans a horizontal synchronizing signal portion, and particularly the sync. tip portion, recorded in the adjacent track $T_B$ or $T_A$, extremely large frequency differences occur between the main video signal and the cross-talk signal of the sync. tip portion, so that the resulting high level interfering signals become a serious problem, that is, the noise corresponding to the sync. tip portion will appear on the picture.

In order to avoid the above problem, the video signal recording and reproducing apparatus according to this invention is provided with the magnetic heads 1a and 1b having a predetermined head width, that is, the width of the heads is selected so that the head scanning the track to be reproduced can also scan the adjacent track with the predetermined overlapping width.

Figure 5:
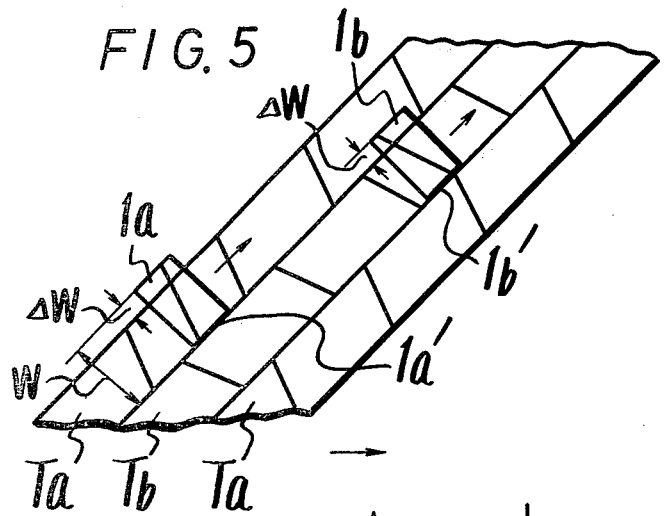
FIG. 5 is a schematic view of a portion of a tracking pattern showing the relationship of the track width and head width according to this invention.

The apparatus of this invention will be explained in more detail with reference to FIG. 5. During reproducing of the slow or long-playing operation, the magnetic heads 1a and 1b are controlled by the servo circuit shown in FIG. 4 so that the heads 1a and 1b scan the respective tracks $T_A$ and $T_B$ with the same phase relationship as that in the recording operation. Consequently, the heads 1a and 1b scan the respective tracks $T_a$ and $T_b$ in the manner that the rightward edges 1a' and 1b' of the heads coincide with the downstream edges of the respective tracks $T_A$ and $T_B$ and each of the heads also scans, by the overlapping width $\Delta W$ the upstream adjacent track.

Figure 6:
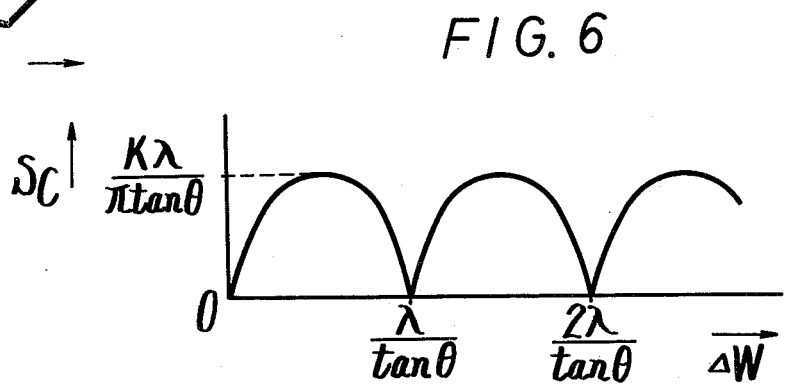
FIG. 6 is a graph showing the azimuth loss characteristic.

As is well known, the relationship of the overlapping width $\Delta W$ and the magnitude of the cross-talk $S_c$ will be given by the following equation;

$$S_c = \frac{K|\sin(\frac{\pi \Delta W}{\lambda} \tan \theta)|}{\frac{\pi}{\lambda} \tan \theta} \quad (1)$$

in which K is a constant, $\lambda$ is a wave length of the recorded signal and $\theta$ is an angular difference between the azimuth angles $\theta_a$ and $\theta_b$ of the heads 1a and 1b ($\theta = \theta_a + \theta_b$). A graphical plot of the cross-talk $S_c$ versus the overlapping width $\Delta W$, of equation (1), is shown in FIG. 6. It will be apparent from the graph that the cross-talk $S_c$ becomes zero at points of $$\Delta W = n \frac{\lambda}{\tan \theta} \quad (n = 1, 2,).$$

The apparatus, according to this invention, utilizes the above-mentioned property of the azimuth heads, to efficiently reduce or attenuate the cross-talk signal having relatively high level interfering signal by adjusting the head width. In other words, the head width W of the heads 1a and 1b is determined so that the overlapping width $\Delta W$ of the heads can eliminate or reduce the cross-talk having a relatively high level which mostly interferes the main signal to be reproduced, that is, the sync. tip portion of the video signal. In the case of the frequency-modulated video signal, the carrier frequency of the sync. tip portion is selected to have the lowest frequency, for example 3.6 MHz. Then, if $\theta_a = \theta_b = 7°$, the optimum value of the overlapping width $\Delta W$ becomes about 8 $\mu$m. Accordingly, the apparatus of this invention has a pair of heads, the predetermined width of which partially scan the next adjacent track so as to reduce the most interfering signal, that is, the carrier as modulated by the synchronizing signal portion of the video signal recorded in the adjacent track, by the azimuth loss.

Figure 8:
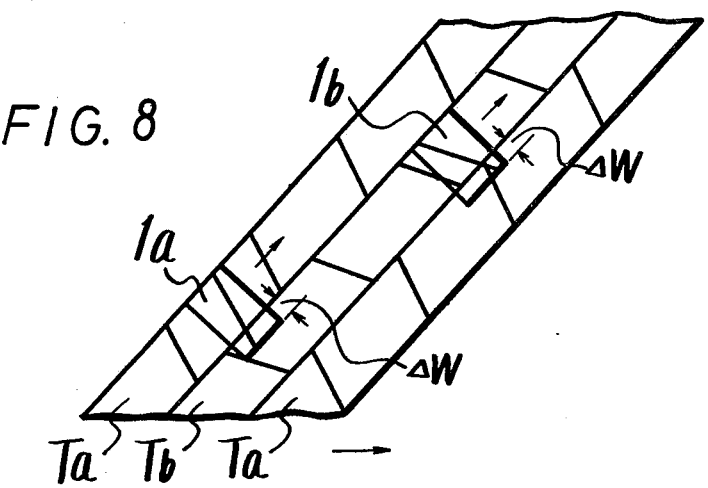
FIG. 8 is a schematic view of a portion of an improved tracking pattern according to this invention.
Figure 7:
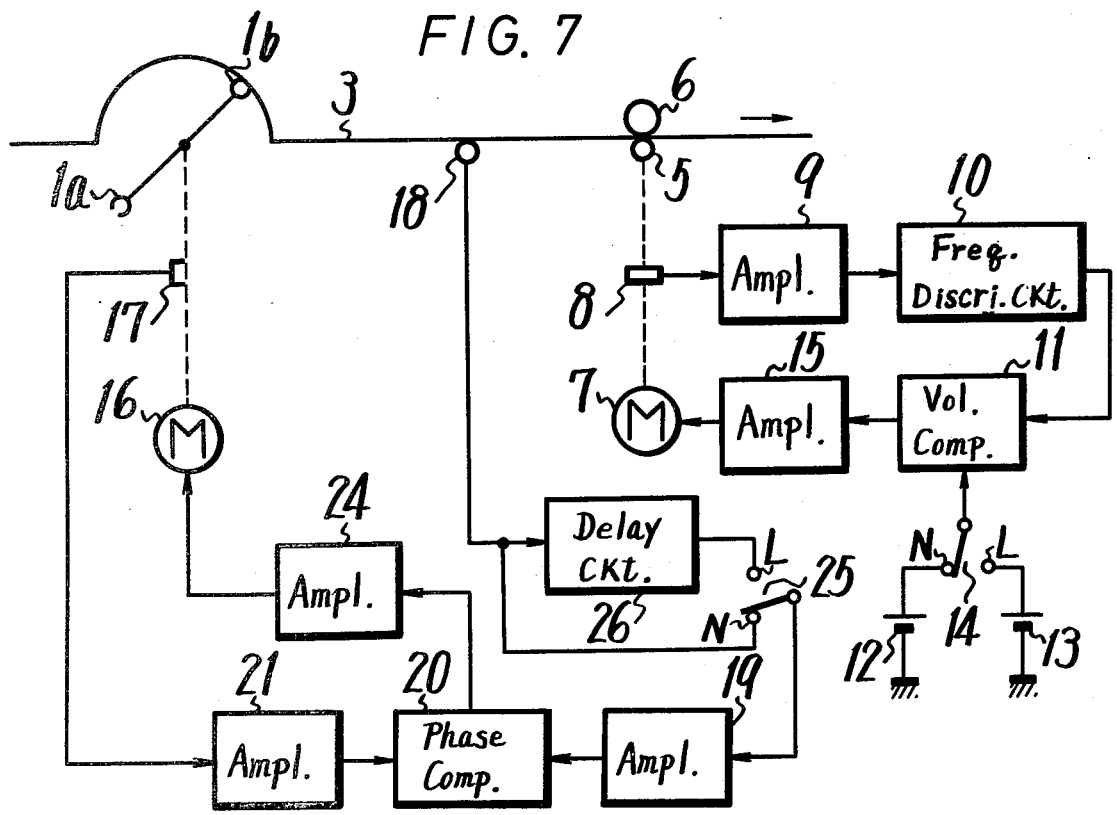
FIG. 7 is a block diagram showing another servo circuit that may be employed to attain the tracking pattern of FIG. 8.

FIG. 7 shows another embodiment of the servo circuit for use in the apparatus of this invention, in which the same numerals are attached to the same elements as that shown in FIG. 4 and the detailed explanation thereof is deleted. In FIG. 7, the output of the control head 18 is first applied to fixed terminal N of further switch 25 and second through a delay circuit 26 to its fixed terminal L. The switch 25 may be coupled with the switch 14, and during normal tape speed operation the movable arm of the switch 25 is connected with the terminal N to perform the same operation as that previously described in reference to FIG. 4. On the other hand, when its movable arm is changed over to engage terminal L, the output of the control head 18 is delayed by a predetermined time in the delay circuit 26 and is supplied through the amplifier 19 to the phase comparater 20, in which the delayed track indicating pulses from the control head 18 are compared with the rotation indicating pulses from the pulse generator 17. The comparison of the rotation indicating pulses with the delayed track indicating pulses means that the heads 1a and 1b cannot scan or reproduce the respective tracks $T_A$ and $T_B$ with the same phase relationship as that in the recording operation. In other words, the head rotating phase is gained by a certain amount determined by the delay circuit 26 in comparison with the phase of the CTL signal. Accordingly, as shown in FIG. 8, during the reproducing operation, the heads 1a and 1b are shifted by some amount in the downstream direction of the tape 3. In this embodiment, the delay amount of the delay circuit 26 is controlled such that the shift of the heads amounts to the width $\Delta W$ so as to reduce the most interfering signal from the downstream adjacent track. In this regard, the leftward edges of the heads coincide with the upstream edges of the respective tracks. Thus, it is apparent that the circuit of FIG. 7 will attain the same advantage as that of FIG. 4. Furthermore, in the circuit of FIG. 7, the heads can purposely be shifted by the width $\Delta W$ from the recording track in the reproducing operation, so that even if the head width of the heads fluctuates around the nominal width W, it is possible to keep the overlapping width $\Delta W$ constant. As a result of the constant overlapping width $\Delta W$, it is possible to attenuate or reduce the most interfering signal in a more stable and reliable manner, once the overlapping width $\Delta W$ is determined in response to the frequency of the interfering signal.

What is claimed is:

1. An apparatus for reproducing video signals recorded on a record medium in successive parallel record tracks which abut along their longitudinal edges and in which the recorded video signals include information and synchronizing signal portion modulating a carrier, a first set of said record tracks being comprised of every other one of the latter and having video signals recorded therein at a first azimuth angle which is different from a second azimuth angle with which video signals are recorded in the remaining tracks constituting a second set of record tracks, and said synchronizing signal portions of the video signals, as recorded in adjacent tracks, are out of alignment with each other; said apparatus comprising:

first and second magnetic heads for sequentially scanning tracks of said first and second sets of tracks, respectively, said first and second magnetic heads having azimuth angles corresponding to said first and second azimuth angles of the respective tracks to be scanned thereby, and each of said heads being dimensioned and guided in the direction transverse to that along the track being scanned so as to span the full width of the track being scanned and to overlap an adjacent track by a distance $\Delta W = n\lambda/\tan\theta$ ($n = 1, 2, \ldots$), wherein $\lambda$ is the wavelength of the carrier as modulated by said synchronizing signal portions of the video signals in said adjacent track and $\theta$ is the difference between said first and second azimuth angles of said heads, so as to substantially attenuate the most troublesome of the cross-talk from said adjacent track.

2. An apparatus according to claim 1; in which said video signals are frequency modulated.

3. An apparatus according to claim 1; in which each of said magnetic heads is guided so that one side of the head moves along a longitudinal edge of the respective one of said record tracks being scanned.

4. An apparatus according to claim 1; further comprising means for shifting the position of said heads in the direction transverse relative to the longitudinal direction of the respective tracks to be scanned so as to overlap the respective adjacent tracks by said distance $\Delta W$.

5. An apparatus according to claim 1; in which said heads are rotary, and in which said means for shifting the position of said heads includes servo circuit means for controlling the rotating phase of said heads in response to a phase difference between pulses corresponding to the rotary position of said heads and pulses corresponding to track identifying pulses reproduced from said record medium.

* * * * *